April 17, 1956 G. BURRELL 2,742,029
VALVE ROTATING DEVICE
Filed Jan. 21, 1953

Inventor
Gilbert Burrell
By Willits, Helwig & Baillio
Attorneys

United States Patent Office 2,742,029
Patented Apr. 17, 1956

2,742,029
VALVE ROTATING DEVICE

Gilbert Burrell Lansing, Mich., assignor to General Motors Corporation, Detroit, Mich., a corporation of Delaware Application January 21, 1953, Serial No. 332,299

7 Claims. (Cl. 123—90)

The invention relates to poppet valves of internal combustion engines and the like, and particularly to devices for rotating such valves in operation.

The present invention represents certain improvements over the valve rotating arrangement covered in the United States application for patent Serial No. 282,042, now Patent No. 2,664,076, of Morris V. Dadd and Paul L. Vermaire filed April 12, 1952. In such Dadd et al. device the valve return spring is shown fixedly connected to the valve stem in conventional manner by a valve spring retainer washer and split wedge-shaped keys which normally prevent any relative rotation between the valve spring and the valve, and provision for accommodating rotation of the valve is in the form of an anti-friction thrust bearing which rotatively supports the opposite end of the valve spring on the cylinder head or other stationary frame portion of the engine.

It is the principal object of my invention to provide a positively acting valve rotating device comprising a coil spring clutch similar to that of the Dadd et al. device, but in a different and novel combination with a split valve spring retainer which obviates the need for rotatively supporting the valve spring on the engine. Important advantages are thus obtained in simplifying and reducing the number of parts required, with a resultant saving in cost. Also, the rotary friction which is inherent in the split retainer is effectively made use of to enhance the positive character of the valve rotation by eliminating retrograde rotation.

The means by which these and other objects and improvements are obtained will be more readily understood from the following description of one preferred embodiment of my invention, having reference to the drawing wherein.

Figure 2:
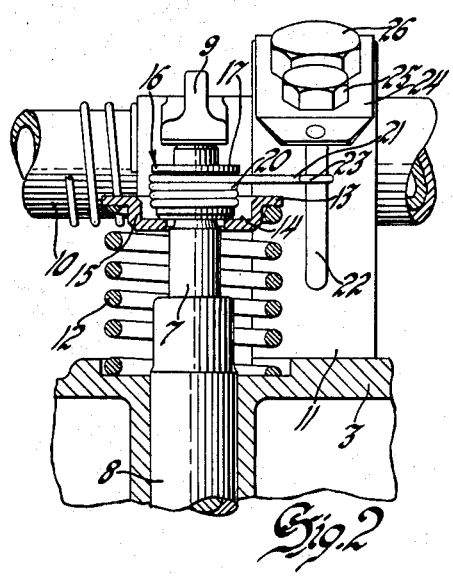
Figure 2 is a sectional view taken substantially on line 2—2 of Figure 1.

Figure 2-a is an enlarged fragmentary view similar to Figure 2 with parts of the valve rotating device shown in section.

Figure 1:
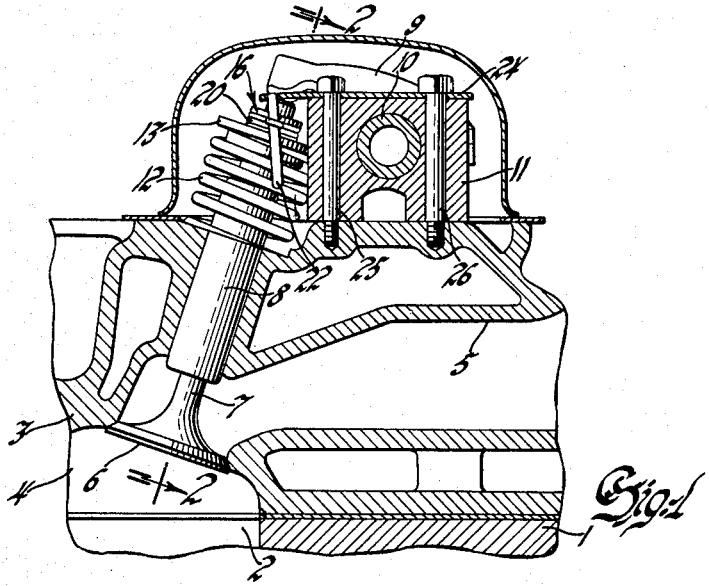
Figure 1 is a partial sectional view of an internal combustion engine showing my improved valve rotating device installed, the section being taken substantially on line 1—1 of Figure 3.
Figure 3:
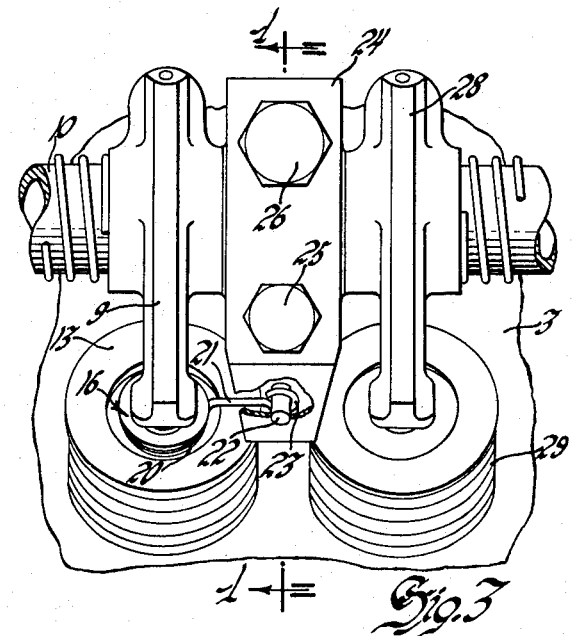
Figure 2A:
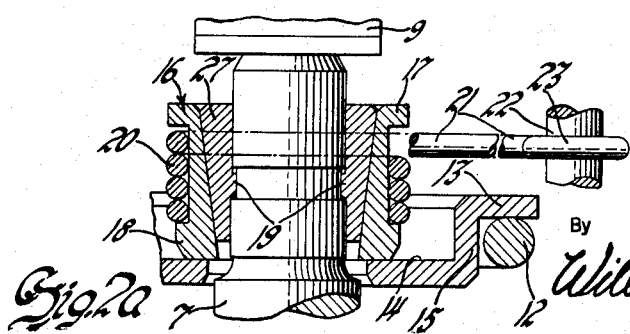

Figure 3 is a plan view of the portion of the engine shown in Figure 1, with parts broken away and in section.

The number 1 designates the cylinder block of the engine in which is formed a working cylinder 2, closed at its upper end by the usual cylinder head 3 which forms a combustion chamber 4. Controlling the entrance to an exhaust passage 5 extending through the cylinder head from the combustion chamber is a poppet valve 6 whose stem 7 is slidably guided for reciprocation and rotation in a bushing 8 suitably fixed in the cylinder head. The valve stem 7 is shown extending above the cylinder head and has its upper end drivably engaged with a rocker 9 which is journalled for oscillation on a rocker shaft 10 supported and spaced from the top of the cylinder head by pedestals, one of which is shown at 11. The opposite end of the rocker from the valve stem 7 is driven in the usual manner by a pushrod and engine driven cam, not shown. A coil compression spring 12 having its lower end resting against a surface provided therefor on the top of the cylinder head acts to maintain the valve in its closed position shown, and to return the valve thereto following each valve opening stroke effected by the rocker and the aforementioned pushrod and cam.

The upper end of the valve return spring 12 seats against a "split" retainer which as best shown in Figure 2-a comprises an upwardly presenting cup-shaped washer 13 having its end wall apertured to loosely surround the valve stem and its side walls externally flanged at their upper ends to engage the valve spring 12. The side walls 15 of this washer loosely fit the internal periphery of the convolutions of the valve return spring 12 and are spaced radially a substantial distance from the external periphery of the valve stem, as shown. Rotatably bearing on the upper face of the washer end wall 13 and closely adjacent its inner marginal extremities thereof, is a sleeve 16 having a preferably cylindrical external periphery between upper and lower shoulders or flanges 17 and 18, respectively. The internal periphery of the sleeve 16 is tapered inwardly toward the valve stem and closely embraces the usual split valve stem locks or keys 27 whose external periphery conforms to this sleeve taper and whose internal peripheries closely fit the valve stem. These valve stem keys are of conventional form in every respect, and are provided on their inner peripheries with annular tongues 19 engaging an annular groove formed in the periphery of the valve stem.

Snugly embracing the cylindrical external periphery of the sleeve 16 and retained endwise thereon by the shoulders 17 and 18 is a second helical spring 20 which serves as a one way clutch for effecting rotation of the valve stem during its reciprocation. This clutch spring is provided with a lever arm 21 which is preferably formed integrally therewith and extends laterally from the end of its upper convolution. The outermost end of this arm 21 forms a loop 23, best shown in Figure 3, which slidably embraces a cam member in the form of a pin 22 which is inclined at an acute angle to the longitudinal axis of the valve stem and has its upper end suitably secured to a bracket 24 extending from the pedestal 11. As shown, the same studs 25 and 26 which secure the pedestal 11 to the cylinder head are used to anchor the bracket to the pedestal.

During operation, as the valve is axially moved downwardly from its position shown in Figures 1 and 2 to its valve open position by the rocker 9, the clutch spring loop slides down the inclined pin 22 and forces the lever arm 21 to rotate the clutch spring in counterclockwise direction (as viewed in Figure 3) about the axis of the valve stem. Depending on the direction (clockwise or counterclockwise) with which the clutch spring is initially wound, this rotation of the clutch spring causes its convolutions to either grip or slip on the sleeve 16. By reason of the particular spring 20, shown, having been initially wound with a counterclockwise helix such rotation during valve opening movements cause the clutch spring to grip on the sleeve, with the result that the sleeve is rotated concurrently therewith, and since the valve stem is fixed to this sleeve by the keys 27, the valve also rotates during its opening movement. Frictional engagement of the valve return spring 12 at its respective ends with the cylinder head and washer 14 serves to restrain this washer from rotating with the sleeve 16. During the valve closing movement, the clutch spring loop 23 in sliding upwardly on the pin 22 rotates the clutch spring to its original position, however, this latter rotation being in the opposite direction of the helix results in the clutch spring slipping on the sleeve. Sufficient friction exists between the lower end of the sleeve 16 and the washer end wall 13 to restrain the sleeve and valve from rotating back to its initial angular position during the valve closing stroke. Thus during each cycle of this valve reciprocating movement the valve is rotated an incremental amount in one direction, and a progressive uni-directional rotation is positively effected during engine operation.

The split retainer connection comprising the washer 13 and sleeve 16 between the valve return spring 12 and valve stem provides a thrust bearing which accommodates rotation of the stem with the desired degree of friction relative to the valve spring to enable the clutch spring to rotate the valve during valve opening while insuring against retrograde rotation of the valve during closing. Thus, this connection not only provides the necessary means for transmitting valve spring thrust to the valve stem but in combination with the clutch spring makes for a simpler and more conveniently assembled and serviced arrangement for obtaining positive valve rotation than has been used heretofore. Also, it will be appreciated that an important cost saving results from the elimination of the separate thrust bearing between the valve return spring and the fixed portion of the engine.

In Figure 3 is shown the rocker 28 and return spring 29 of an adjacent inlet valve, which may also be provided with rotating means similar to that described above for the exhaust valve should such be desired.

While only a single preferred embodiment of the invention has been disclosed, it is appreciated that numerous minor changes in the construction and arrangement of the parts may be made without departing from the spirit and scope of the invention as defined in the following claims.

I claim:

1. In combination with a reciprocably and rotatably guided member, means for reciprocating said member including a spring having a connection thereto for relative rotation and urging the member in one longitudinal direction, said connection comprising elements respectively fixed to said member and spring and having opposed thrust surfaces in rotary frictional engagement with each other, a coil spring having at least one convolution embraceably gripping said member and provided with a laterally out-turned portion forming a lever for rotating the spring, and a fixed member having a cam surface operatively engaged by said portion and inclined to the axis of rotation of said first named member.

2. In combination with a reciprocably and rotatably guided stem, means for reciprocating said stem including a spring acting to urge the stem longitudinally in one direction, a connection between the stem and spring for transmitting thrust therebetween and accommodating their relative rotation, said connection comprising elements respectively fixed to the stem and spring having coacting rotary bearing surfaces in series thrust relation between said stem and spring, a coil clutch spring embraceably gripping said stem fixed element and having a laterally out-turned end, and a fixed member inclined to the axis of the stem and slidably interengaged with said end of the clutch spring.

3. In combination with a valve having a reciprocably and rotatably guided stem, valve reciprocating means including a coil spring resiliently opposing stem longitudinal movement in one direction and having a connection thereto accommodating their relative rotation, said connection comprising a sleeve fixed to the stem and a washer thrustably interposed between the sleeve and said spring, said sleeve and washer having opposed thrust surfaces in coacting rotary bearing engagement, a second coil spring embraceably gripping said sleeve and secured against longitudinal displacement relative thereto, and a fixed member having a cam surface inclined to the longitudinal axis of the stem and operatively engaging one end of said second spring.

4. In combination with a valve having a reciprocably and rotatably guided stem, valve reciprocating means including a coil spring having a connection at one end with the stem for imparting axial thrust to the stem while accommodating relative rotation between the stem and spring, said connection including a washer having one side in abutment adjacent its outer marginal extremities with said one end of the spring and a sleeve fixed concentrically to the stem, said sleeve having one of its ends in axial rotary bearing engagement with the opposite side of the washer adjacent the inner marginal extremities of the washer and a shoulder spaced from said sleeve end, a coil clutch spring embraceably gripping said sleeve adjacent said shoulder and terminating at one end in a laterally extending arm, and a fixed member provided with a surface inclined to the axis of the stem and in cammed engagement with said arm.

5. A valve mechanism comprising a valve having a stem mounted for axial rotation and reciprocation, valve reciprocating means including a spring having one end fixed and its other end reciprocable with the valve, a thrust transmitting connection between said spring other end and the valve stem accommodating their relative rotation including a sleeve concentric with and fixed to the stem and a spring retaining washer in end-wise rotary bearing engagement with the sleeve, a coil clutch spring having its convolutions snugly embracing the sleeve with sufficient tightness that rotation of one end of the clutch spring in one direction about the stem causes the clutch spring to grip the sleeve and rotation of said clutch spring end in the opposite direction causes the clutch spring to slip rotatively on the sleeve, a laterally ending lever arm connected to said clutch spring end forming a loop, and a fixed pin inclined to the axis of the stem and slidably fitting said loop.

6. In a valve reciprocating mechanism including a valve stem, a valve rocker, a valve rocker shaft, a support for said shaft, a valve return spring and a connection between said spring and the valve stem including members operatively fixed to the stem and spring, respectively, having spring thrust transmitting surfaces in coacting rotary bearing engagement and radially spaced concentric annular surfaces, the improvement consisting of a coil clutch spring having its convolutions concentric with and snugly engaging said annular surface of the stem fixed member, one end of said clutch terminating in a laterally extending loop, and a pin fixedly depending from said support at an acute angle to the axis of the stem and slidably embraced by said loop.

7. In a poppet valve rotating device for an internal combustion engine having a cylinder head with a poppet valve having its stem reciprocably and rotatably guided therein, a valve stem driving rocker journalled for oscillation by a shaft mounted on a pedestal bolted to the cylinder head, a coil valve return spring surrounding the stem between the cylinder head and the rocker engaged end of the stem, a cup-shaped member having its end wall apertured to loosely receive the stem and having its side walls externally flanged to abut the end of the spring nearest said rocker, a sleeve fixed to the stem and rotatably bearing end-wise on the end wall of said cup-shaped member, a coil clutch spring snugly embracing the sleeve within said cup-shaped member and having its end nearest the valve rocker provided with a laterally extending lever arm terminating in a loop disposed outwardly adjacent the lateral extremities of the return spring, a rigid pin inclined to the axis of the stem and slidably embraced by said loop, and a bracket supporting said pin and spaced from the cylinder head by said pedestal.

References Cited in the file of this patent

UNITED STATES PATENTS

| | | |
|---|---|---|
| 2,589,418 | Mitzelfield et al. | Mar. 18, 1952 |
| 2,590,719 | MacPherson | Mar. 25, 1952 |
| 2,660,990 | Azmuda | Dec. 1, 1953 |
| 2,664,075 | Azmuda | Dec. 29, 1953 |
| 2,664,076 | Dadd et al. | Dec. 29, 1953 |